(12) United States Patent
Miranda

(10) Patent No.: US 12,355,394 B1
(45) Date of Patent: Jul. 8, 2025

(54) ADAPTIVE SOLAR PANEL MOUNTING AND PROTECTION APPARATUS AND METHOD THEREOF

(71) Applicant: X3 Solar Corp, Dover, DE (US)

(72) Inventor: Greg Miranda, Winter Park, FL (US)

(73) Assignee: X3 Solar Corp, Dover, DE (US)

( * ) Notice: Subject to any disclaimer, the term of this patent is extended or adjusted under 35 U.S.C. 154(b) by 0 days.

(21) Appl. No.: 18/913,234

(22) Filed: Oct. 11, 2024

(51) Int. Cl.
  *H02S 20/32* (2014.01)
  *H02S 10/40* (2014.01)
(52) U.S. Cl.
  CPC .............. *H02S 20/32* (2014.12); *H02S 10/40* (2014.12)
(58) Field of Classification Search
  None
  See application file for complete search history.

(56) References Cited

U.S. PATENT DOCUMENTS

| | | |
|---|---|---|
| 9,654,053 B2 | 5/2017 | Panish |
| 2013/0118099 A1 | 5/2013 | Scanlon |
| 2013/0319402 A1 | 12/2013 | Shaw |

FOREIGN PATENT DOCUMENTS

CN 108347215 B 7/2018

*Primary Examiner* — Dustin Q Dam
(74) *Attorney, Agent, or Firm* — Owen G. Behrens; Smith & Hopen, P.A.

(57) ABSTRACT

Described herein relates to a solar panel mounting apparatus and methods thereof for optimizing solar energy capture and/or protecting solar panels from adverse weather conditions. The apparatus may include a rotation drive module that adjusts the orientation of solar panels throughout the day based on time-of-day data to maximize sunlight exposure. The apparatus may also comprise a plurality of integrated sensors to monitor sunlight intensity and/or environmental conditions, providing real-time input to a control unit that may continuously automate panel positioning. Additionally, the apparatus may comprise a safety drive module that allows the solar panels to collapse into a protected position within the mounting structure during extreme weather events including high winds or hail. The retraction may be triggered automatically by a weather detection module or manually, via override controls. These operations may ensure both optimal energy production and/or enhanced panel durability, making the system suitable for varied environmental conditions.

13 Claims, 13 Drawing Sheets

ADAPTIVE SOLAR PANEL MOUNTING AND PROTECTION APPARATUS AND METHOD THEREOF

BACKGROUND OF THE INVENTION

1. Field of the Invention

This invention relates, generally, to mounting systems. More specifically, it relates to relates to a collapsable solar panel mounting apparatus and methods thereof for optimizing solar energy capture through adaptive solar tracking mechanisms and/or protecting photovoltaic cells (e.g., solar panels) from adverse weather conditions using automated retraction and/or safety mechanisms.

2. Brief Description of the Prior Art

Renewable energy sources have increasingly been seen as the solution to meeting growing energy demands while reducing greenhouse gas emissions and/or human dependence on fossil fuels. One of these renewable energy sources is solar photovoltaic cells. The use of these solar cells and/or photovoltaic cells allows for the conversion of light energy into electrical energy by the photovoltaic effect.

In solar energy systems, efficiency is an important aspect of the useful energy output of the system. For example, commercial photovoltaic cells typically have less than 15% conversion efficiency of incident solar energy. To increase efficiency, a solar energy device must be placed and/or angled in the direction of maximum exposure to the sun's energy throughout the day. However, most photovoltaic cells are stationary and placed at a fixed orientation, such that the photovoltaic cells may not always be directly placed in the direction of maximum exposure to the sun's energy.

It is currently known to utilize photovoltaic cell (e.g., solar panel) assemblies in sun-tracking systems to follow the sun's trajectory to maximize energy generation throughout the day. It is also known that tracking the sun with a photovoltaic cell assembly on one axis improves the energy capture of the photovoltaic cell by up to 25%. Most current tracking systems utilize a small number of photovoltaic cells (e.g., about five cells to about ten cells panels). As such, the small number of photovoltaic cells on the moving parts of the solar tracker multiplies the number and/or complexity of the drives' mounting and control systems of a large installation, which adds overall cost for those systems and the installation thereof. Indeed, current systems require installation of a significant number of parts in the field which adds to the cost of the overall system and the installation costs. It is estimated that the cost for installing the photovoltaic cell assemblies in the field can be three times the cost of actually constructing and assembling the photovoltaic cells compared to the controlled environment of the proposed assembly plant. Installation of the photovoltaic cell assemblies in the field is also prone to weather risks and project delays, in addition to damage to the photovoltaic cells during extreme weather conditions and/or environmental elements. Still yet another drawback of current photovoltaic cell tracking assemblies is that their assembly in the field is not easily automated nor is there an ability to control the tilt, height, and/or shape of the photovoltaic cells throughout the day.

Accordingly, what is needed is safe, efficient, and effective mounting apparatus configured to optimize solar energy capture through adaptive solar tracking mechanisms and/or to protect photovoltaic cells from adverse weather conditions using automated retraction and/or safety mechanisms. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a solar panel mounting apparatus for optimizing solar energy capture. In an embodiment, the solar panel mounting apparatus may comprise the following: (a) a framework comprising a mounting end and a base end, the mounting end of the framework being adapted to support a plurality of photovoltaic cells; (b) a rotation drive module disposed about at least one portion of the framework, the rotation drive module being in mechanical communication with the mounting end of the framework, such that the rotation drive module may enable an orientation of the mounting end of the framework to be adjusted in relation to the elevation and/or location of the sun throughout each day; and (c) a safety drive module disposed about at least one portion of the mounting end of the framework, the safety drive module being in mechanical communication with the mounting end and/or the plurality of photovoltaic cells, such that the safety drive module may enable an adjustment of position of at least one of the plurality of photovoltaic cells from a neutral position to a protection position in relation to a weather event and/or an environmental condition.

In some embodiments, the solar panel mounting apparatus may further comprise a plurality of solar panel harnesses, each of the plurality of solar panel harnesses being affixed to each of the plurality of photovoltaic cells, such that the plurality of solar panel harnesses may couple the plurality of photovoltaic cells to the mounting end of the framework. In these other embodiment, the solar panel mounting apparatus may also comprise a plurality of protection cables, the plurality of protection cables being in mechanical communication with the plurality of solar panel harnesses and the safety drive module. In this manner, subsequent to activation of the safety drive module, the plurality of protection cables may be configured to translate and/or rotate at least one of the plurality of harnesses from the neutral position to the protection position. Moreover, in these other embodiments, the neutral position may comprise an orientation configured to receive maximum solar radiation from the sun, and/or the protection position may comprise an accordion orientation configured to protect at least one of the plurality of photovoltaic cells from the weather event and/or the environmental condition.

In some embodiments, the solar panel mounting apparatus may further comprise a mobility module, the mobility module being affixed to the base end of the framework, such that the mobility module may enable the translation of the framework from a first location to at least one alternative location. As such, the mobility module further comprises a plurality of wheels. Furthermore, in these other embodiments, the framework may further comprise a handle, such that, subsequent to a manually applicable directional pressure being received by the handle, the plurality of wheels may cause the framework to be translated from the first location to the at least one alternative location.

In some embodiments, the solar panel mounting apparatus may further comprising a raising drive module, the raising drive module being in mechanical communication with the mounting end of the framework and/or the mobility module, such that the raising drive may enable an elevation change of the mounting end from a first predetermined location to a plurality of predetermined and/or desired height positions based on a surrounding environment.

In some embodiments, the solar panel mounting apparatus may also comprise a control unit (e.g., at least one computing device) having at least one processor, the at least one processor being communicatively coupled to the rotation drive module and/or the safety drive module. In these other embodiments, the solar panel mounting apparatus may further comprise the following: (i) a solar sensor disposed about at least one portion of at least one of the plurality of solar panel harnesses and/or at least one of the plurality of photovoltaic cells, such that the solar sensor may be configured to (A) detect an amount of solar light and/or solar irradiance collected by the plurality of photovoltaic cells, and/or (B) transmit the detected amount of solar light and/or solar irradiance to the at least one processor; and (ii) a force sensor disposed about at least one portion of at least one of the plurality of solar panel harnesses and/or at least one of the plurality of photovoltaic cells, such that the force sensor may be configured to (A) detect an amount of directional pressure applied to at least one of the plurality of photovoltaic cells, and/or (B) transmit the detected amount of directional pressure to the at least one processor. In this manner, subsequent to receiving the detected amount of solar light and/or solar irradiance from the solar sensor, the processor may be configured to cause the rotation drive module to automatically and/or continuously tilt and/or rotate the mounting end of the framework with respect to a central axis of the framework to an orientation ensuring maximum solar light and/or solar irradiance collection by at least one of the plurality of photovoltaic cells. Additionally, in these other embodiments, subsequent to receiving the detected applied directional pressure from the force sensor, the processor may be configured to cause the safety drive module to translate and/or rotate the mounting end of the framework from the neutral position to the protection position, causing the plurality of photovoltaic cells to translate into an accordion shape.

Another aspect of the present disclosure pertains to a method for optimizing solar energy capture. In an embodiment, the method may comprise the following steps: (a) affixing a plurality of photovoltaic cells to a solar panel mounting apparatus, the solar panel mounting apparatus comprising: (i) a framework comprising a mounting end and a base end, the mounting end of the framework being adapted to support a plurality of photovoltaic cells; (ii) a rotation drive module disposed about at least one portion of the framework, the rotation drive module being in mechanical communication with the mounting end of the framework, such that the rotation drive module may enable an orientation of the mounting end of the framework to be adjusted in relation to the elevation and/or location of the sun throughout each day; and (iii) a safety drive module disposed about at least one portion of the mounting end of the framework, the safety drive module being in mechanical communication with the mounting end, the plurality of photovoltaic cells, or both, such that the safety drive module may enable an adjustment of position of at least one of the plurality of photovoltaic cells from a neutral position to a protection position in relation to a weather event and/or an environmental condition, and (b) adjusting, via the rotation drive module, in real-time, the plurality of photovoltaic cells to an orientation ensuring the maximum collection of solar energy by the plurality of photovoltaic cells based on the position of the sun throughout the day.

In some embodiments, the solar panel mounting apparatus may further comprise a plurality of solar panel harnesses, each of the plurality of solar panel harnesses being affixed to each of the plurality of photovoltaic cells, such that the plurality of solar panel harnesses may couple the plurality of photovoltaic cells to the mounting end of the framework. In addition, in these other embodiments, the solar panel mounting apparatus may further comprise a plurality of protection cables, the plurality of protection cables being in mechanical communication with the plurality of solar panel harnesses and the safety drive module.

In some embodiments, subsequent to activation of the safety drive module, the plurality of protection cables may be configured to translate and/or rotate at least one of the plurality of harnesses from the neutral position to the protection position. Accordingly, in these other embodiments, the neutral position may comprise an orientation configured to receive maximum solar radiation from the sun, and/or the protection position may comprise an accordion orientation configured to protect at least one of the plurality of photovoltaic cells from the weather event and/or the environmental condition.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
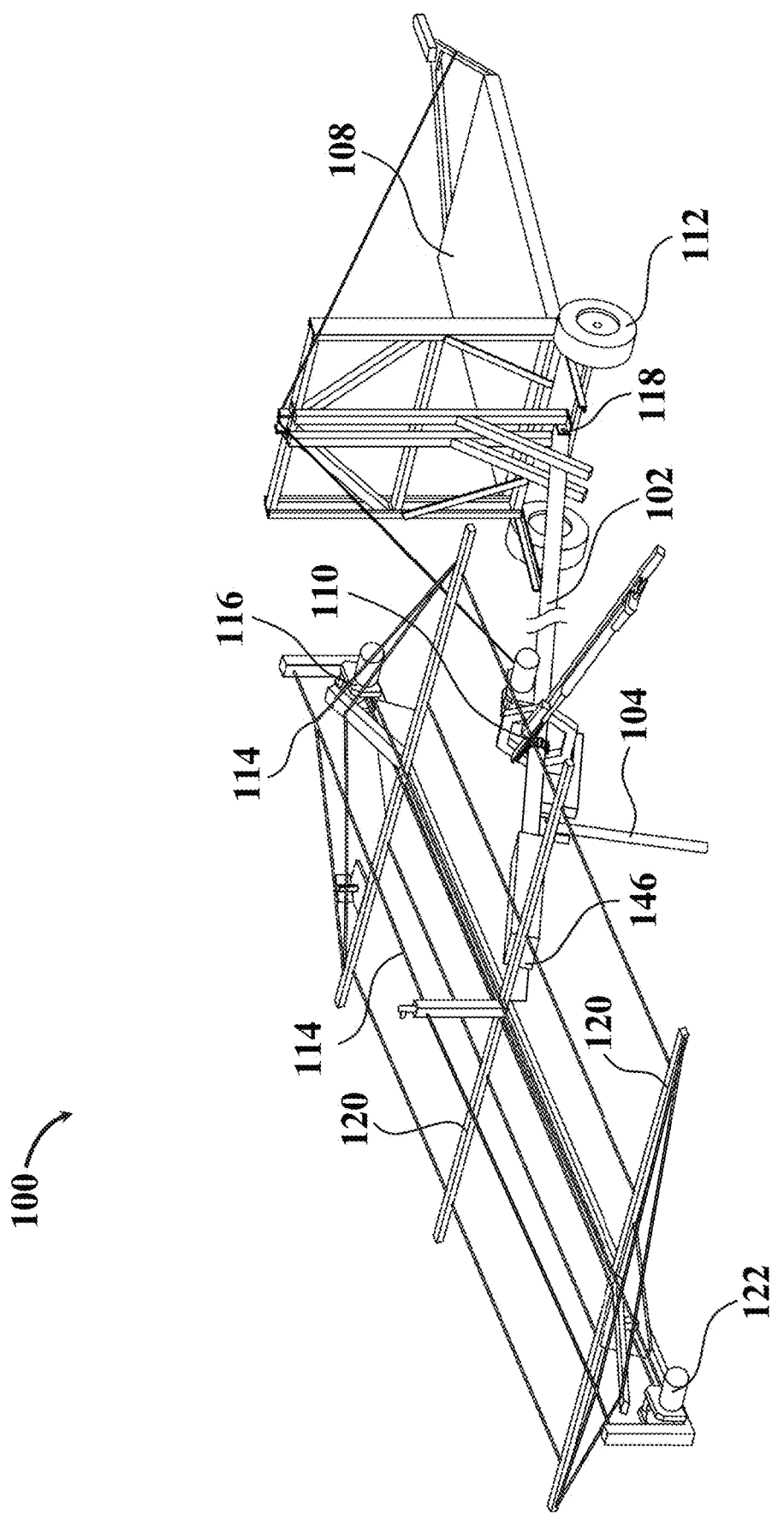
FIG. 1 is a graphical illustration depicting a front-perspective view of a solar panel mounting apparatus, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g. circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

As used herein, the term "communicatively coupled" refers to any coupling mechanism known in the art, such that at least one electrical signal may be transmitted between one device and one alternative device. Communicatively coupled may refer to Wi-Fi, Bluetooth, wired connections, wireless connection, and/or magnets. For ease of reference, the exemplary embodiment described herein refers to Wi-Fi and/or Bluetooth, but this description should not be interpreted as exclusionary of other electrical coupling mechanisms.

As used herein, the term "mechanical communication" refers to any physical connection between two or more components known in the art that enables the transfer of force, motion, or mechanical energy from one component to another. Non-limiting examples of mechanical communication may include direct contact through linkages such as gears, levers, cables, shafts, or other mechanical elements that facilitate the transmission of movement or control signals. Mechanical communication may ensure that adjustments in position and/or orientation may be precisely executed as directed by a system's control mechanisms.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system) (e.g., the degree of precision required for a particular purpose, such as varying tilt angles of a solar panel with respect to the movement of the sun throughout the day, in addition to protecting the individual solar panels from extreme weather conditions). As used herein, "about," "approximately," or "roughly" refer to within ±25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Solar Panel Mounting Apparatus

The present disclosure pertains to a solar panel mounting apparatus and methods thereof for optimizing solar energy capture and/or protecting solar panels from adverse weather conditions. In an embodiment, solar panel mounting apparatus may include a motorized rotation drive module configured to automatically and/or continuously adjust the orientation (e.g., about ±45° with respect to a central axis of a framework of the solar panel mounting apparatus) of a plurality of photovoltaic cells disposed thereupon, in real-time, throughout the day based on time-of-day data to maximize sunlight exposure. In this manner, the solar panel mounting apparatus may comprise a plurality of integrated sensors (e.g., solar sensors and/or force sensors) to monitor sunlight intensity and/or environmental conditions, providing real-time input to a control unit (e.g., at least one computing device and/or at least one external computing device) having at least one processor that may automate the positioning of the plurality of photovoltaic cells.

As such, in an embodiment, the solar panel mounting apparatus may also comprise a safety drive module configured to allow the at least one of the plurality of photovoltaic cells to translate, rotate, and/or collapse into a protected position (e.g., an accordion position) within the solar panel mounting apparatus during extreme weather events, including but not limited to high winds, hurricanes, and/or hail. Moreover, the retraction may be triggered automatically by a weather detection module of the safety mechanism or manually by at least one user, via override controls. The solar panel mounting apparatus will be described in greater details in the sections below.

As such, FIG. 1 depicts a graphical illustration of a solar panel mounting apparatus 100, according to an embodiment of the present disclosure. In this embodiment, solar panel mounting apparatus 100 may comprise an extendable framework 102 having a solar mounting end 146 and a base end 118. In this manner as shown in FIG. 1, solar mounting end 146 may be in mechanical communication with a plurality of solar panel harnesses 120, such that the plurality of solar panel harnesses 120 may be configured to temporarily affix to a plurality of photovoltaic cells. Accordingly, in this embodiment, the plurality of photovoltaic cells, in addition to the plurality of solar panel harnesses 120 and/or extendable framework 102 may be in mechanical communication with a plurality of protection cables 114, the plurality of protection cables 114 being configured to automatically collapse (e.g., rotate and/or translate) the plurality of photovoltaic cells into a protection position based on an extreme weather event (e.g., winds, hurricanes, and/or hail).

In this manner, as shown in FIG. 1, in an embodiment, solar mounting end 146 may comprise a safety drive module having a first safety drive motor 116 and a second safety drive motor 122 in mechanical communication with the plurality of protection cables 114. As such, the first and/or second safety drive motors 116, 122 may be configured to translate the solar panel harnesses 120 from a neutral position (e.g., plurality of photovoltaic cells being entirely flat with respect to the plurality of solar panel harnesses 120), allowing for full capture of solar energy, via the plurality of photovoltaic cells, to a protection position (e.g., the plurality of photovoltaic cells being in an accordion shape, such that the plurality of photovoltaic cells are protected from an extreme weather event), and/or vice versa, via the plurality of protection cables 114.

Figure 9A:
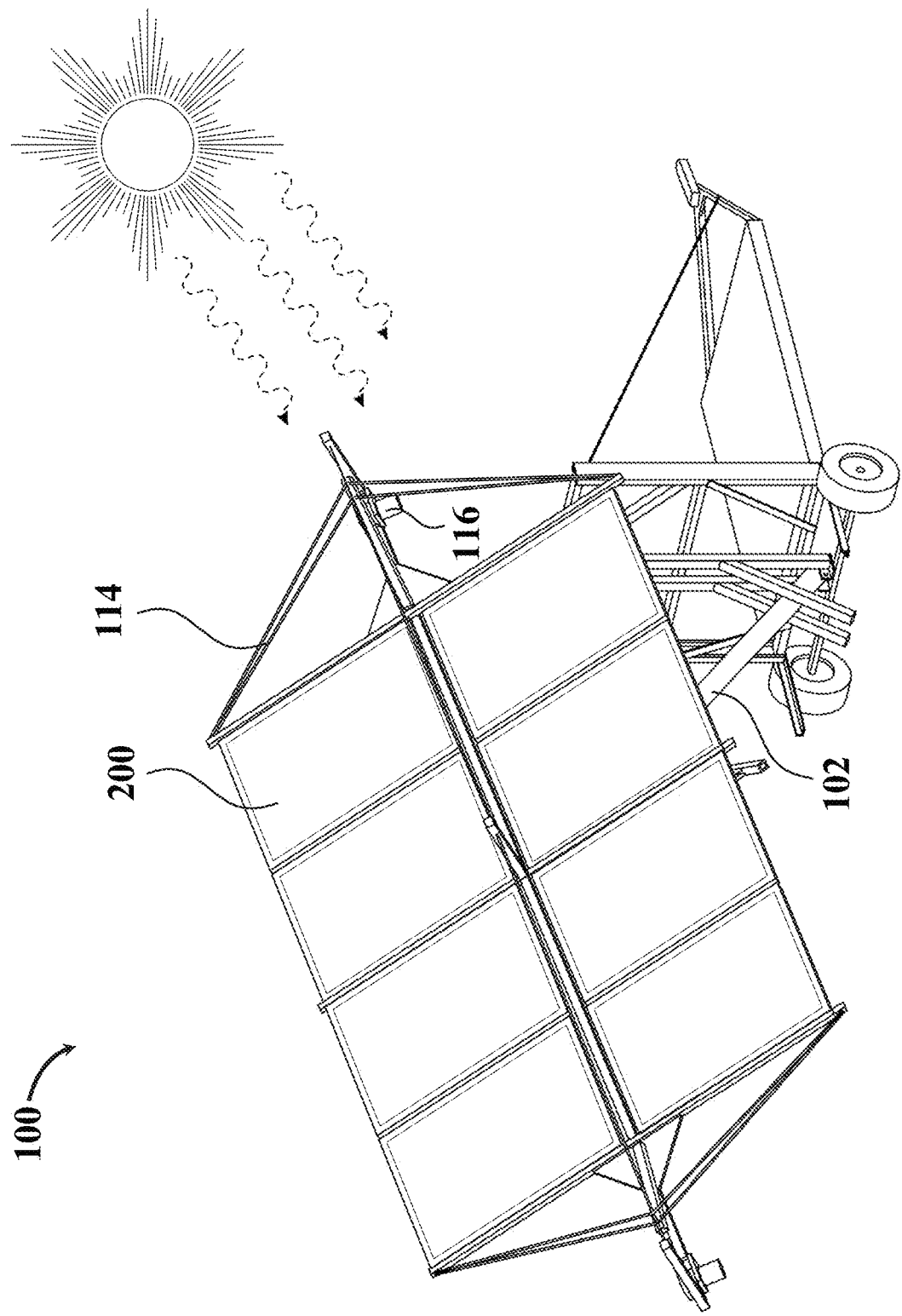
FIG. 9A is a graphical illustration depicting a perspective view of a solar panel mounting apparatus oriented to a first location based on a position of the sun, according to an embodiment of the present disclosure.
Figure 9B:
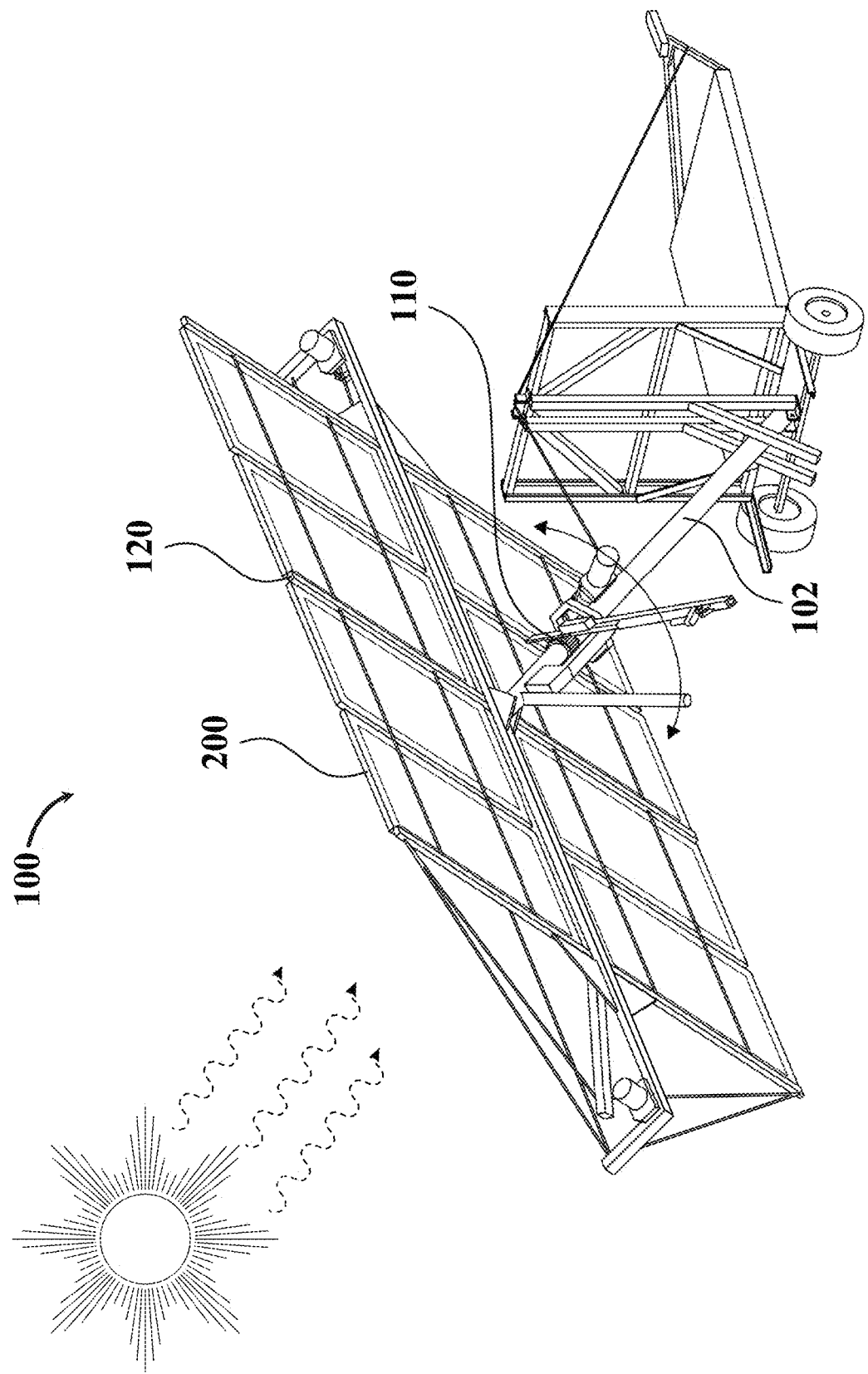
FIG. 9B is a graphical illustration depicting a perspective view of a solar panel mounting apparatus oriented to a second location based on an alternative position of the sun, according to an embodiment of the present disclosure.

Furthermore, in an embodiment, extendable framework 102 may further comprise a solar rotation drive module 110 configured to orient the plurality of photovoltaic cells based on the position of the sun throughout the day. As such, the rotation drive module 110 may comprise at last one motor, such that at least one of the plurality of photovoltaic cells may be automatically and/or continuously adjusted (i.e., yaw adjustment), in real-time. In this manner, solar panel mounting apparatus 100 may comprise at least one solar sensor configured to determine, in real-time, an amount of solar energy on at least one of the plurality of photovoltaic cells disposed on mounting end 146 of solar panel mounting apparatus 100 throughout the day (e.g., time-of-day data), in addition to providing azimuth angle data and/or a zenith angle data between solar panel mounting apparatus 100 and the position of the sun throughout the day. As such, solar panel mounting apparatus 100 may comprise a control unit (e.g., at least one computing device) having at least one processor, such that the at least one processor may be communicatively coupled to the at least one solar sensor. Based on the time-of-day data provided by the at least one solar sensor, in addition to calculating an azimuth angle and/or a zenith angle based on the time-of-day data, in this embodiment, the at least one processor may be configured to transmit an electric signal to the solar rotation drive module 110, such that the solar rotation drive module 110 may activate and translate at least one of the plurality of photovoltaic cells to an orientation in which the solar panel receives maximum radiation from the sun (e.g., as shown in FIGS. 9A-9B).

Accordingly, the solar sensor may comprises any sensor known in the art configured to measure broadband solar light and/or irradiance as well as solar ration flux density. Non-limiting examples of the solar sensor may include photodiodes, photoresistors, phototransistors, and/or photovoltaic light sensors. For ease of reference, the exemplary embodiment described herein refers to photodiodes, but this description should not be exclusionary of other solar light sensors.

Figure 2:
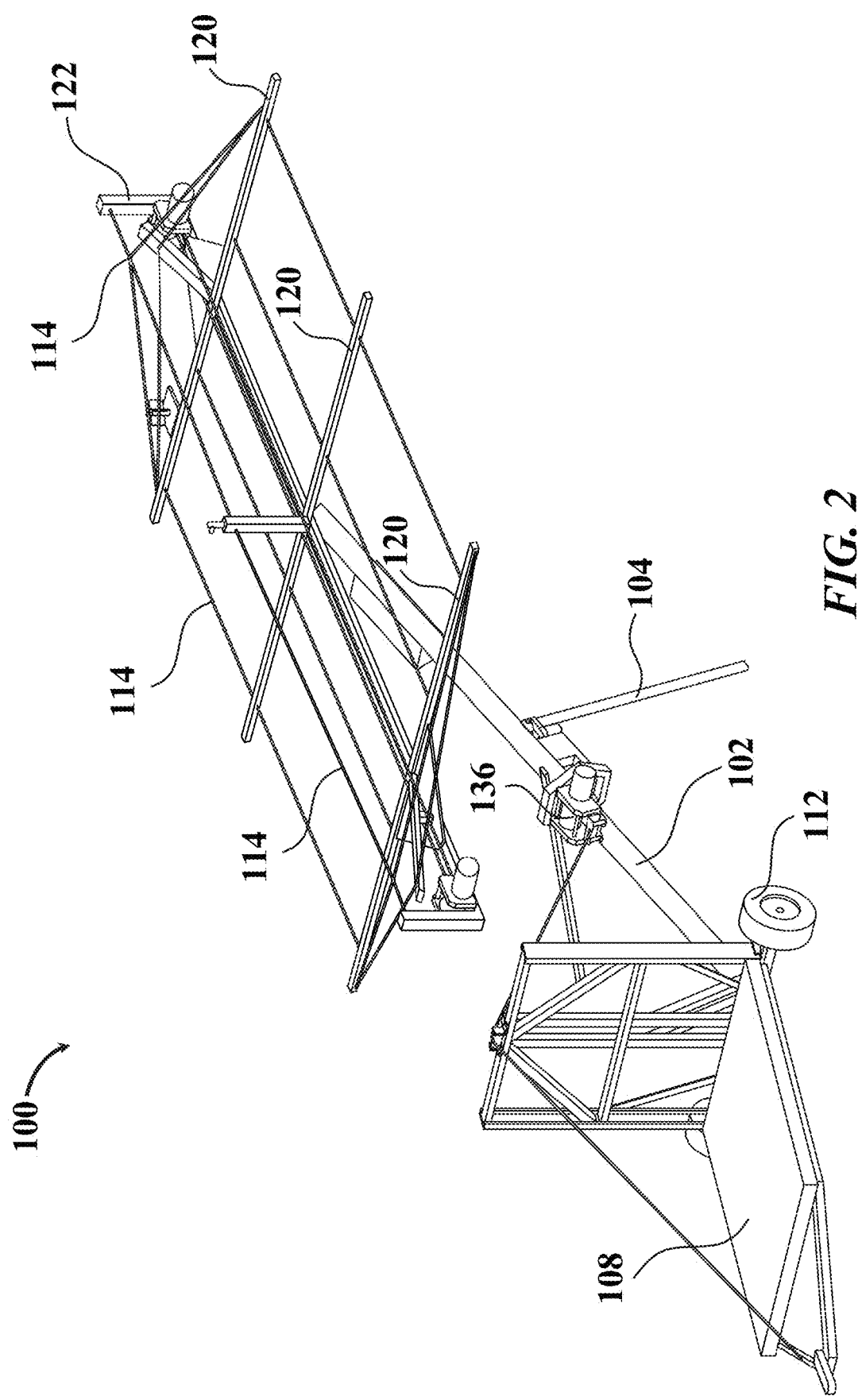
FIG. 2 is a graphical illustration depicting a back-perspective view of the solar panel mounting apparatus of FIG. 1, according to an embodiment of the present disclosure.
Figure 3:
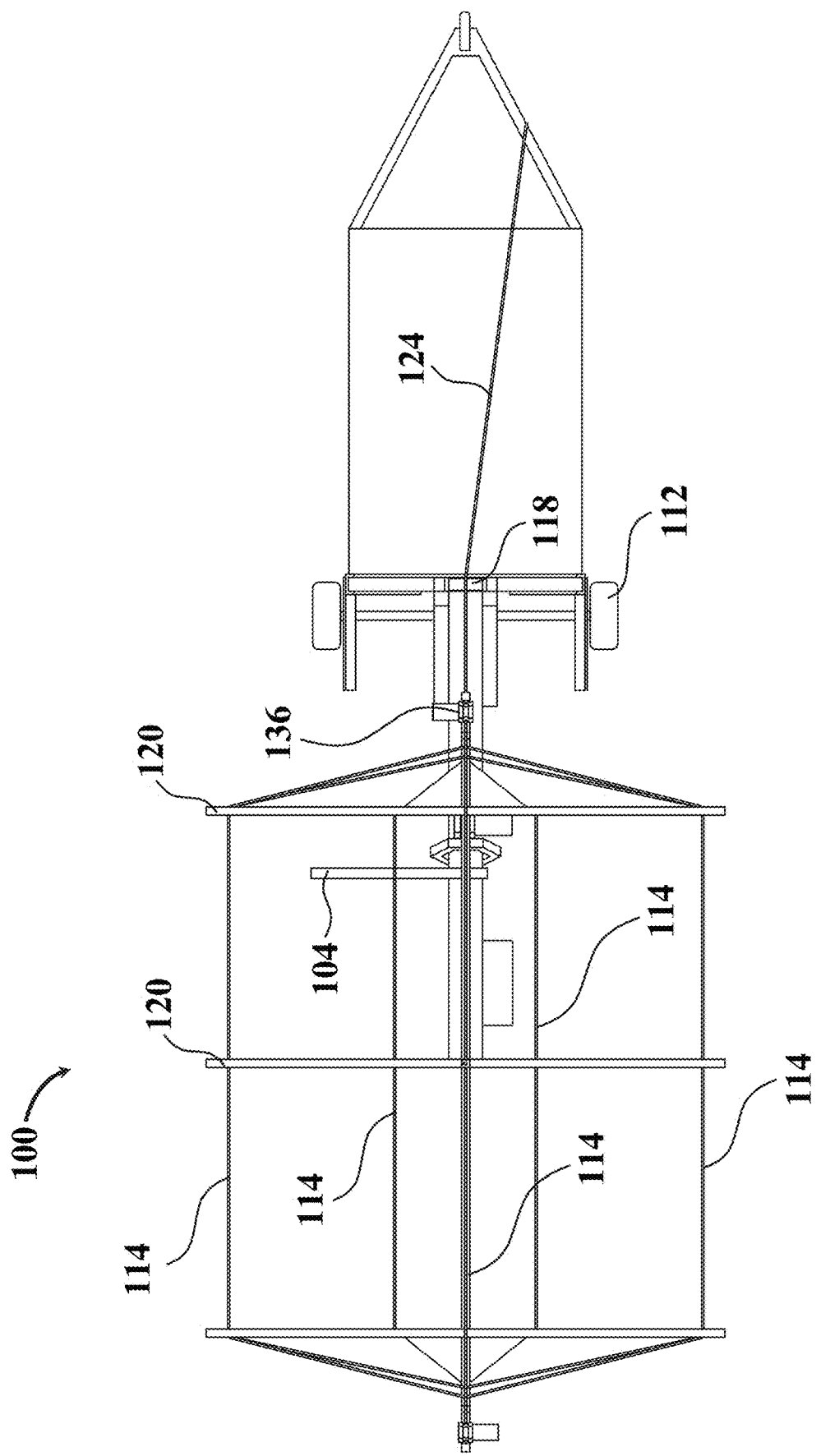
FIG. 3 is a graphical illustration depicting a top planar view of the solar panel mounting apparatus of FIG. 1, according to an embodiment of the present disclosure.
Figure 4:
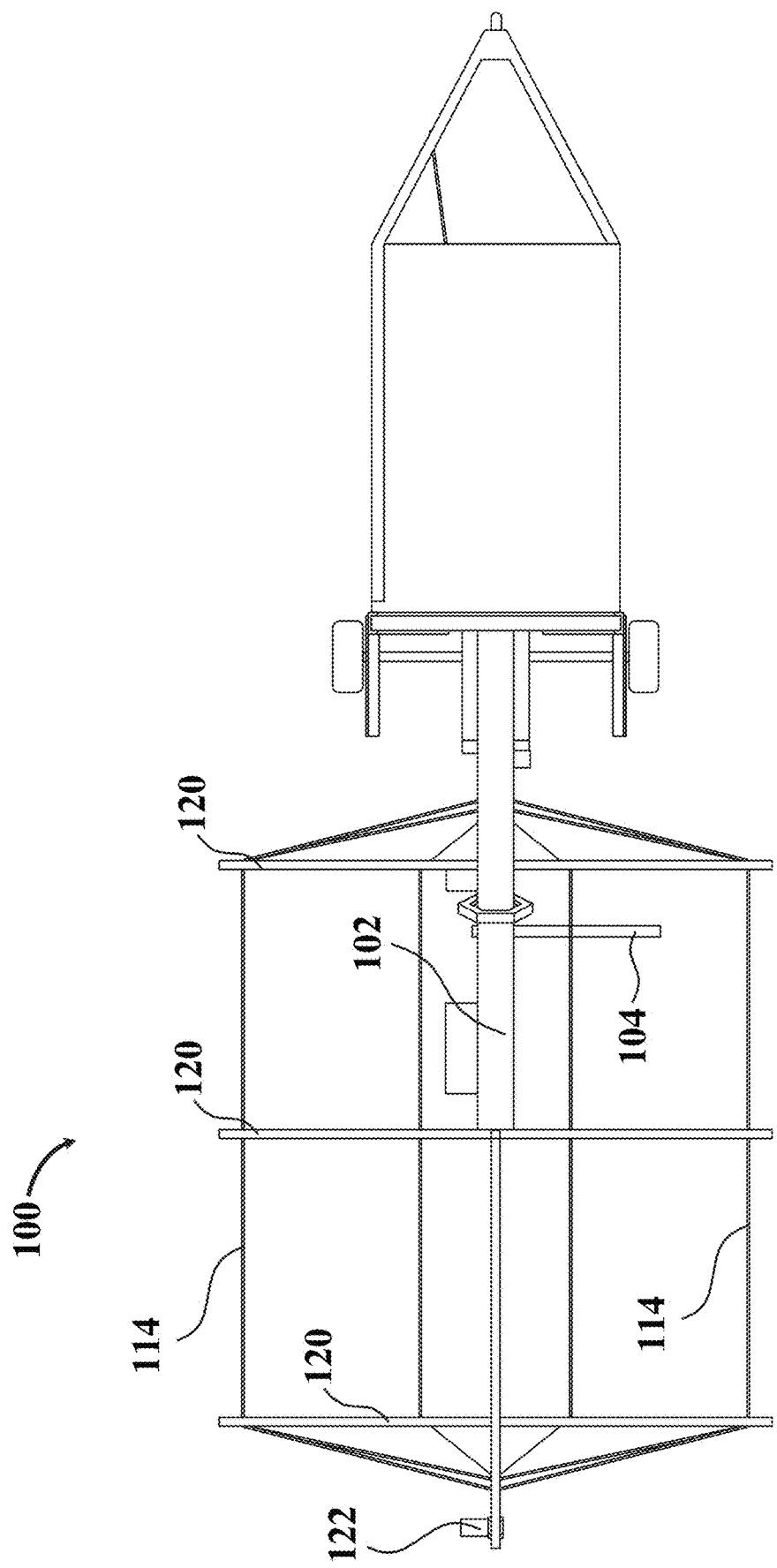
FIG. 4 is a graphical illustration depicting a bottom planar view of the solar panel mounting apparatus of FIG. 1, according to an embodiment of the present disclosure.

Additionally, as shown in FIG. 2, in conjunction with FIG. 1, in an embodiment, extendable framework 102 may further comprise raising drive module 136, disposed about at least one portion of extendable framework 102. In this embodiment, the raising drive module 136 may be manually and/or automatically triggered, such that mounting end 146 of framework 102 may be translated from a predetermined ground position to a plurality of predetermined and/or desired height positions, and/or vice versa. As such, as shown in FIG. 3 and FIG. 4, in conjunction with FIGS. 1-2, in this embodiment, the first and/or second safety drive motors 116, 122 of the safety drive module may be in mechanical communication the plurality of protection cables 114 and/or the plurality of solar panel harnesses 120. Moreover, in this embodiment, solar panel mounting apparatus 100 may comprise at least one force sensor configured to detect a level of force disposed upon at least one of the plurality of solar panel harnesses 120 and/or the plurality of protection cables 114.

In this manner, first and/or second safety drive motors 116, 122 may be communicatively coupled to the at least one processor. In this manner, at least one of the plurality of protection cables 114 may be configured to directly interact with first and/or second safety drive motor 116, 122, such that subsequent to receiving an input from the at least one force sensor higher than a predetermined level, the at least one processor may be configured to transmit an electrical signal to first and/or second safety drive motor 116, 122, such that first and/or second safety drive motor 116, 122 may translate the plurality of protection cables 114 within a cable storage unit of first and/or second safety drive motor 116, 122, thereby translating the plurality of solar harnesses 120, in addition to the plurality of photovoltaic cells into a protection position.

Additionally, as shown in FIGS. 2-4, in conjunction with FIG. 1, in an embodiment, solar panel mounting apparatus 100 may further comprise a mobility module 108, such that solar panel mounting apparatus 100 may be configured to be readily transported to an optimum location to avoid any potential blockage (e.g., tree, building, and/or car) of the sun. As such, mobility module 108 of solar panel mounting apparatus 100 may comprise a plurality of wheels 112, such that solar panel mounting apparatus 100 may be readily portable and/or locomotive either manually, via a handle 104 disposed about at least one portion of extendable framework 102 of solar panel mounting apparatus 100 and/or a hitch 148, hitch 148 being configured to temporarily couple and/or affix to a mobile vehicle (e.g., car, truck, mobile home, etc.).

Figure 5:
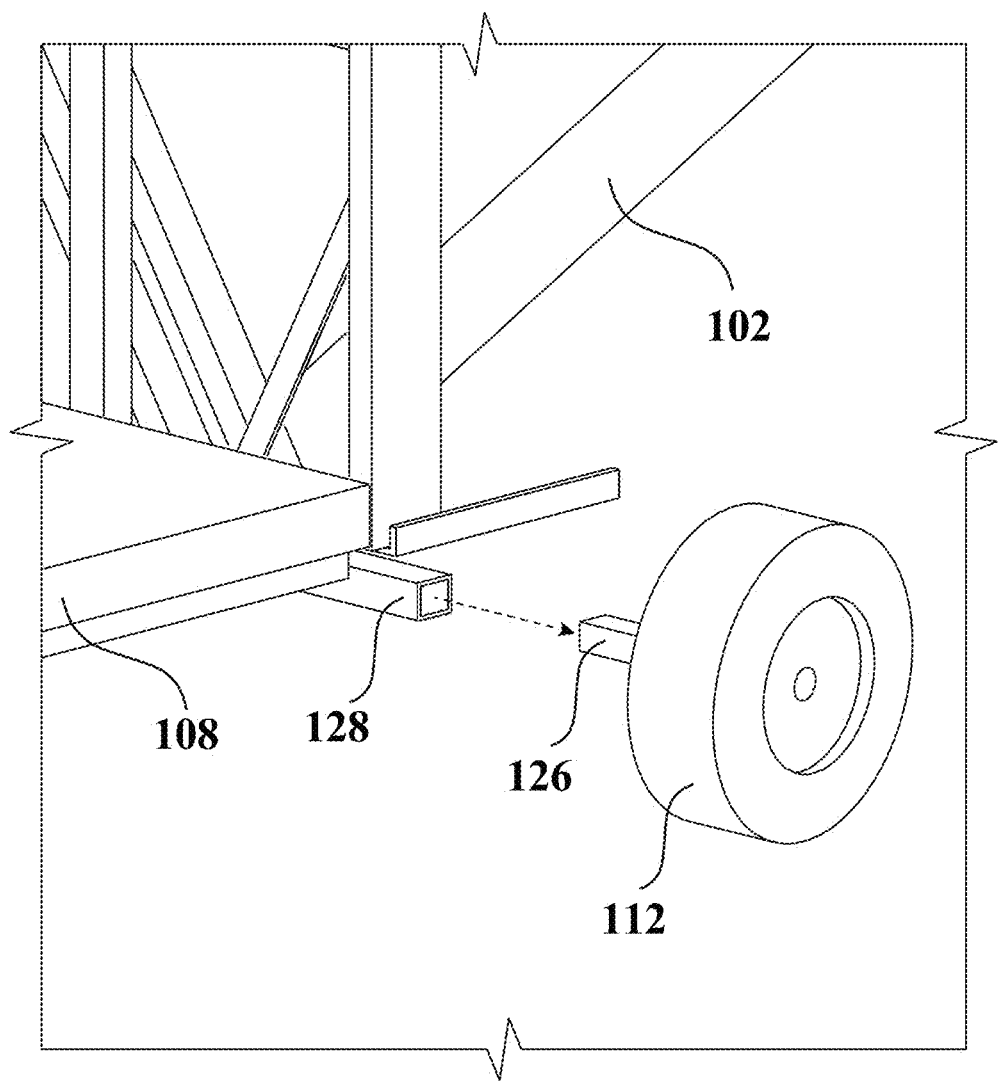
FIG. 5 is a graphical illustration depicting a perspective view of a mobility module of the solar panel mounting apparatus of FIG. 1, according to an embodiment of the present disclosure.

Furthermore, as shown in FIG. 5, in conjunction with FIGS. 1-4, in an embodiment, the plurality of wheels 112 may be temporarily coupled and/or removed from mobility module 108, via a plurality of receiving apertures 128, such that solar panel mounting apparatus 100 may be disposed stationary in a predetermined position. In this manner, when solar panel mounting apparatus 100 is transported, the plurality of wheels 112 may be temporarily affixed to the plurality of receiving apertures 128, via at least one connecting mechanism 126, such that solar panel mounting apparatus 100 may be freely translated from one location to at least one alternative location. In some embodiments, the plurality of wheels 112 of solar panel mounting apparatus 100 may be replaced with any object known in the art configured to enable solar panel mounting apparatus 100 to move easily over the ground. Non-limiting examples of the object may include wheels, skates and/or tracks. For ease of reference, the exemplary embodiment described herein refers to wheels, but this description should not be interpreted as exclusionary of other objects configured to enable solar panel mounting apparatus 100 to move easily over the ground.

Figure 6:
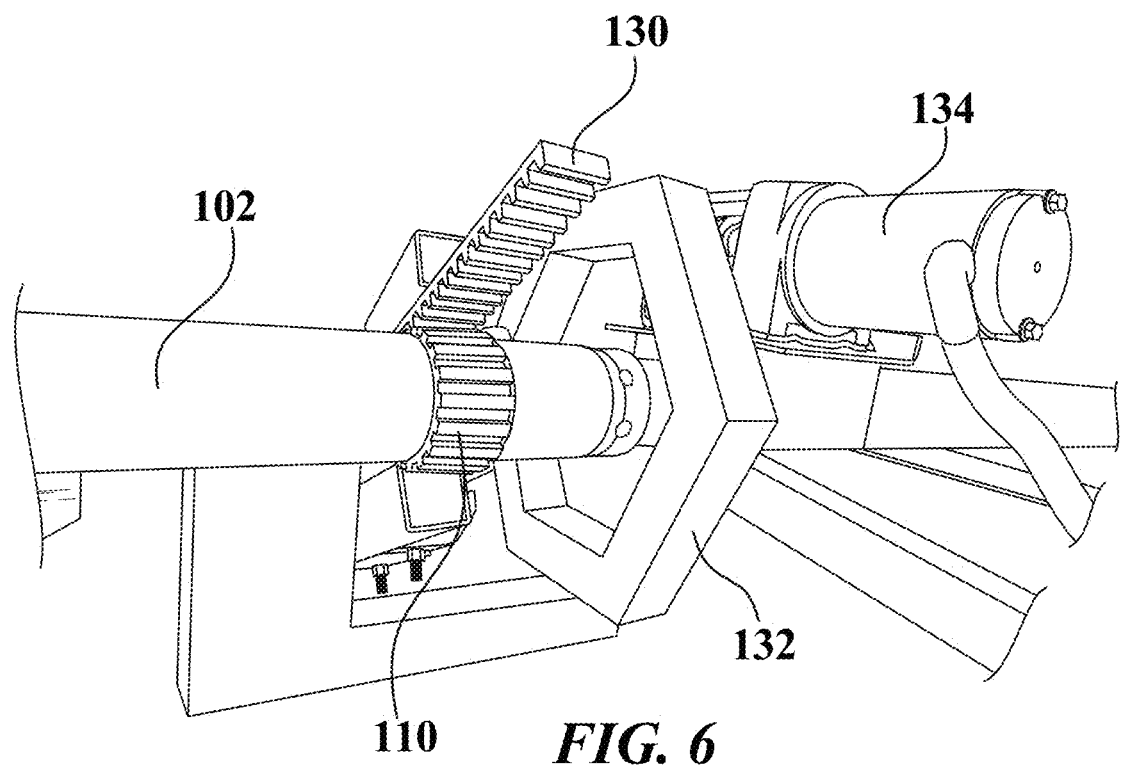
FIG. 6 is a graphical illustration depicting a perspective view of a rotation drive module of a solar panel mounting apparatus, according to an embodiment of the present disclosure.

As shown in FIG. 6, in conjunction with FIGS. 1-4, in an embodiment, as disclosed above, solar panel mounting apparatus 100 may comprise the rotation drive module 110 in mechanical communication with mounting end 146 and/or at least one of the plurality of solar panel harnesses 120. As such, rotation drive module 110 may comprise the at least one motor 134 in mechanical communication with rotation apparatus 130, configured to rotate (e.g., about 360° with respect to a central axis of framework 102 of solar panel mounting apparatus 100) at least one portion of framework 102, mounting end 146, and/or at least one of the plurality of solar panel harnesses 120 disposed above rotation drive module 110. Accordingly, in this embodiment, mounting end 146 and/or at least one of the plurality of solar panel harnesses 120 may be rotated manually via a rotation handle 132 disposed about at least one portion of framework 102. In this embodiment, rotation drive module 110 may be communicatively coupled to the at least one processor of the control unit of the solar panel mounting apparatus 100, such that subsequent to receiving an electrical signal, via at least one user interface of the control unit and/or at least one user interface of at least one external control unit (e.g., at least one external computing device (e.g., a mobile device)) communicatively coupled to the processor, the at least one processor may transmit a signal to rotation drive module 110, such that rotation drive module 110 may automatically and/or continuously tilt (e.g., ±180° with respect to a central axis of framework 102 of solar panel mounting apparatus 100 (i.e., yaw adjustment)) and/or orient mounting end 108 of framework 102 and/or at least one of the plurality of solar panel harnesses 120 to at least one of a plurality of orientations based on the real-time location of the sun throughout the day, via the at least one user interface of the control unit and/or the at least one external control unit.

As used herein, the at least one motor of rotation drive module 110, refers to any motor known in the art configured to impart rotational forces upon mounting end 146 of framework 102. Non-limiting examples of the at least one motor may include linear motors, stepper motors, actuators, servo motors, DC servo motors, and/or continuous rotation servo motors. For ease of reference, the exemplary embodiment described herein refers to actuators, but this description should not be interpreted as exclusionary of other motors.

Figure 7:
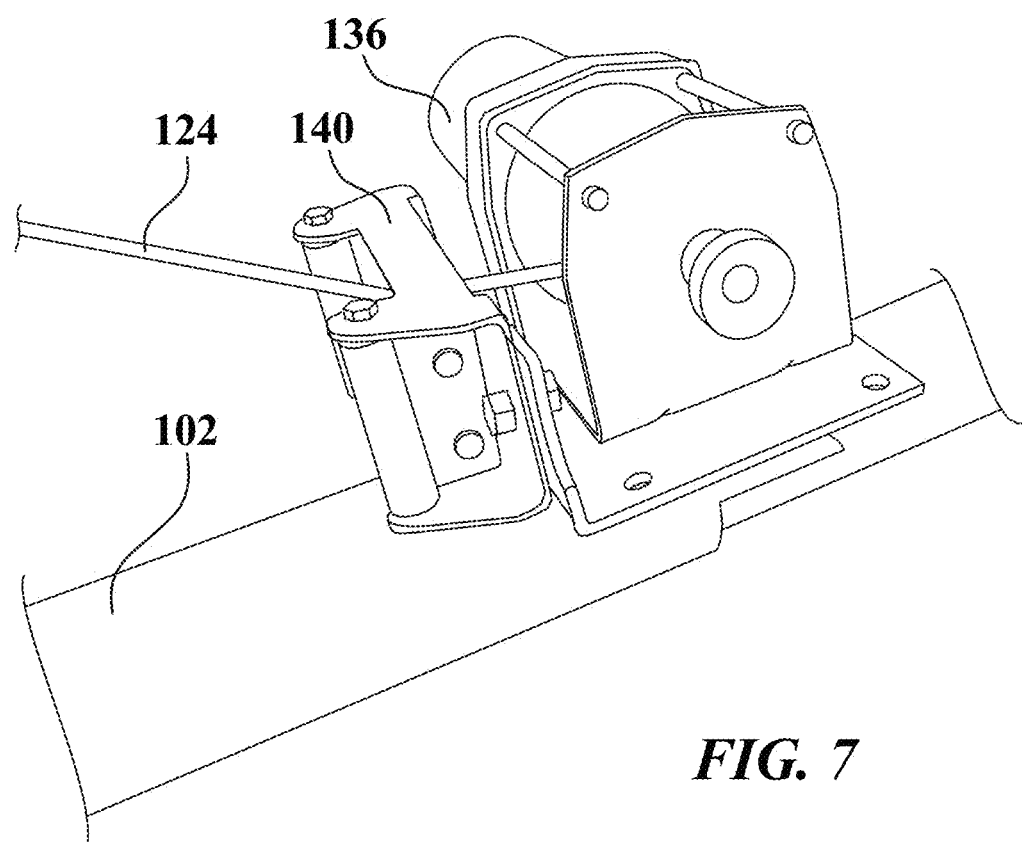
FIG. 7 is a graphical illustration depicting a perspective view of a raising drive module of a solar panel mounting apparatus, according to an embodiment of the present disclosure.

As shown in FIG. 7, in conjunction with FIGS. 1-4, in an embodiment, as disclosed above, solar panel mounting apparatus 100 may comprise raising drive module 136, such that raising drive module 136 may raise and/or elevate mounting end 146 of framework 102 from the predetermined ground position to the plurality of predetermined and/or desired height positions (e.g., a first height position comprising mounting end 146 being 0° with respect to mobility module 108; a second height position comprising mounting end being 90° with respect to mobility module 108), and/or vice versa. Accordingly, in this embodiment raising drive module 136 may be configured to raise and/or elevate mounting end 146 about 0° to about 90° with respect to a horizontal axis of mobility module 108, encompassing every value in between (i.e., mounting end 146 may be parallel in height and/or elevation with respect to mobility module 108 at 0° and/or framework 102 may create a 90° angle with respect to mobility module 108 when mounting end 146 is fully elevated). In this manner, raising drive module 136 may be in mechanical communication with raising cable 124, such that raising cable 124 may wrap within a raising cable storage unit of raising drive module 136. In this embodiment, a first end of raising cable 124 may be affixed to at least one portion of mobility module 108 and/or a second end of raising cable 124 may be affixed to the raising cable storage unit of raising drive module 136, as shown in FIG. 7. Furthermore, raising cable drive unit may be in mechanical communication with a locking mechanism 140. As such, locking mechanism 140 may be configured to temporarily hold raising cable 124 at a predetermined position when raising drive module 136 deactivates, allowing mounting end 146 of framework 102 to maintain at least one of the plurality of predetermined and/or desired height and/or elevation positions.

Additionally, in an embodiment, the raising drive module 136 may be communicatively coupled to the at least one processor of the control unit of the solar panel mounting apparatus, such that subsequent to receiving an electrical signal, via at least one user interface of the control unit and/or at least one user interface of at least one external control unit communicatively coupled to the processor, the at least one processor may transmit a signal to raising drive module 136, such that raising drive module may raise mounting end 108 of framework 102 to at least one of a plurality of predetermined and/or desired height and/or elevation positions based on the inputted height, via the at least one user interface of the control unit and/or the at least one external control unit.

Moreover, as shown in FIG. 7, in conjunction with FIGS. 1-4, in an embodiment, raising drive module 136 of solar panel mounting apparatus 100 may enable at least one of the plurality of solar panels to be elevated and/or lowered relative to the base end of framework 102. In addition, as disclosed above raising drive module 136 may be in mechanical communication with the base end of framework 102, allowing raising drive module 136 to lift and/or the mounting end 146 of framework 102 along a vertical axis. In this manner, in an embodiment, the raising drive module may be equipped with a raising cable and/or track system that may extend and/or retract to achieve various predetermined and/or desired height and/or elevation adjustments. As such, raising drive module 136 may enable at least one of the plurality of solar panels disposed on mounting end 146 of framework 102 to be positioned at different elevations to maximize solar exposure, especially in areas where terrain and/or obstacles may obstruct sunlight at lower angles.

In addition, in an embodiment, raising drive module 136 may interact closely with the baes end of framework 102 to ensure stability during elevation changes, allowing smooth transitions between predetermined and/or desired height and/or elevation positions without compromising the structural integrity of solar panel mounting apparatus 100. Accordingly, in this embodiment, as disclosed above raising drive module 136 may be configured to lock the mounting end into place at a predetermined and/or desired height, via locking mechanism 140, preventing unwanted movement due to wind and/or vibrations. Additionally, in some embodiments, raising drive module 136 may be designed to work in coordination with mobility module 108, ensuring that the apparatus can be repositioned and/or transported while maintaining the chosen elevation (e.g., the predetermined and/or desired height being locked via locking mechanism 140). In this manner mobility module 108, which includes a plurality of wheels 112 and/or tracks, may enable solar panel mounting apparatus 100 to be moved to a different location, while raising drive module 136 may maintain and/or allow mounting end 146 of framework 102 to maintain an optimal elevation during transport. In these other embodiments, the integrated functionality may allow for precise control over both the location and/or height of solar panel mounting apparatus 100, ensuring that solar panel mounting apparatus 100 may adapt to varying environmental conditions and/or maximize energy collection.

Furthermore, in some embodiments, raising drive module 136 may be responsive to user input, via the at least one user interface of the control unit and/or at least one external control unit, and/or at least one automated signals from the control unit and/or at least one external control unit, allowing automatic and/or continuous adjustments to be made based on real-time environmental data (e.g., time-of-day data and/or calculated azimuth angles and/or calculated zenith angles) and/or specific user preferences.

Figure 8:
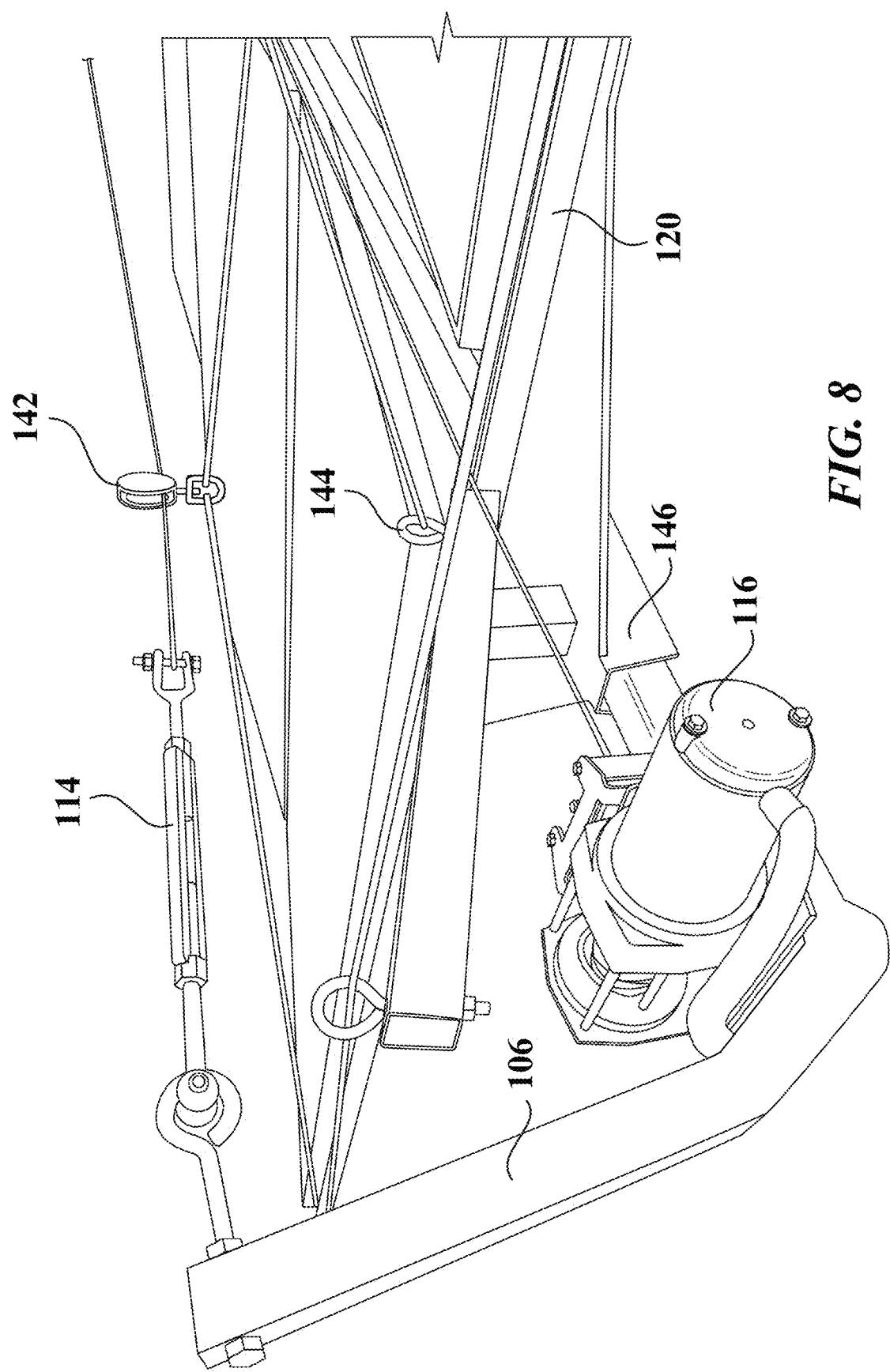
FIG. 8 is a graphical illustration depicting a perspective view of a safety drive module of a solar panel mounting apparatus, according to an embodiment of the present disclosure.

In addition, as shown in FIG. 8, in conjunction with FIGS. 1-4, in an embodiment, as disclosed above, solar panel mounting apparatus 100 may comprise a safety drive module having first and/or second safety drive motor 116, 122 in mechanical communication with the plurality of protection cables 114, and/or the plurality of solar panel harnesses 120. Accordingly, in this embodiment, each of the plurality of protection cables 114 may be coupled and/or in mechanical communication with at least one alternative protection cable 114, via at least one cable connector 142. Additionally, each of the plurality of protection cables 114 may be temporarily coupled and/or in mechanical communication with at least one of the plurality of solar panel harnesses 120, via at least one cable hook 144. As such, subsequent to receiving an electrical signal from the at least one processor, first and/or second safety drive motor 116, 122 may translate at least one of the plurality of protection cables 114, and/or therefore at least one of the plurality of solar panel harnesses 120, such that the at least one of the plurality of solar panel harnesses may translate from the neutral position to the protection position, and/or vice versa. In this manner, first and/or second safety drive motor 116, 122 may be disposed about at least one portion of mounting end 146 of framework 102, such that both the first and second safety drive motor 116, 122 may be configured to translate at least one of the plurality of protection cables, such that at least one of the plurality of harnesses 120 may be translated and/or collapsed from the neutral position to the protection position. In this same manner, first and/or second safety drive motor 116, 122 may be communicatively coupled to the at least one processor, such that the plurality of solar harnesses 120 may be automatically translated from the neutral position to the protection position (e.g., accordion position), based on the real-time data input of the at least one force sensor.

Accordingly, as shown in FIG. 9A and FIG. 9B, in conjunction with FIGS. 1-4 and FIG. 6, in an embodiment, solar panel mounting apparatus 100 may be configured to disposed the plurality of photovoltaic cells 200, via the plurality of protection cables 114, in addition to the plurality of solar panel harnesses 120, to a first orientation based on the location of the sun during the day. In this manner, the at least one solar sensor of the solar panel mounting apparatus 100 may be configured to automatically and/or continuously collect and/or determine an amount of light and/or photo radiation received by the plurality of photovoltaic cells 200 throughout the day, in addition to providing azimuth angle data and/or zenith angle data to the control unit, such that the control unit may determine the maximum solar light and/or radiation received throughout the day.

In this manner, the at least one solar sensor may be configured to transmit the solar dataset comprising the total amount of solar light and/or radiation collected, in addition to the azimuth angle data and/or the zenith angle data, (hereinafter "solar dataset") to a memory of the control unit and/or the at least one processor of the control unit. As such, in this embodiment, as shown in FIG. 9B, based on the solar dataset, the at least one processor of solar panel mounting apparatus 100 may be configured to calculate optimal azimuth angles and/or zenith angles throughout the day and/or may also automatically and/or continuously activate rotation drive module 110, based on the real-time calculated azimuth angles and/or zenith angles, such that the at least one motor 134 may be configured to automatically and/or continuously translate the mounting end 146 of framework 102, in real-time, to a position of highest solar light and/or radiation collection, thereby optimizing the photovoltaic properties of the plurality of photovoltaic cells 200 disposed on the plurality of solar harnesses 120.

Moreover, as shown in FIG. 9A and FIG. 9B, in an embodiment, mounting end 146 and/or the plurality of solar harnesses 120 of solar panel mounting apparatus 100 may be configured to tilt about 360° with respect to a central axis of framework 102. As such, mounting end 146 and/or the plurality of solar harnesses 120 of solar panel mounting apparatus 100 may be configured to rotate and/or orient the plurality of photovoltaic cells in a direction toward the mobility module 108, away from the mobility module 108, and/or about 180° with respect to the central axis of framework 102. Furthermore, in some embodiments, the at least one motor 134 of rotation drive module 110 may be cable driven. As such, in these other embodiments, framework 102 may comprise an independent platform disposed within an internal cavity of framework 102. In this manner, the at least one motor 134 of rotation drive module 110 may be disposed about at least one portion of the independent platform, such that subsequent to activating, the at least one motor may be configured to rotate the mounting end 146 of framework end to a predetermined orientation, via a ball bearing system, while framework 102 remains stationary. In some embodiments, the at least one motor 134 of rotation drive module 110 may comprise a winch gear motor.

Figure 10A:
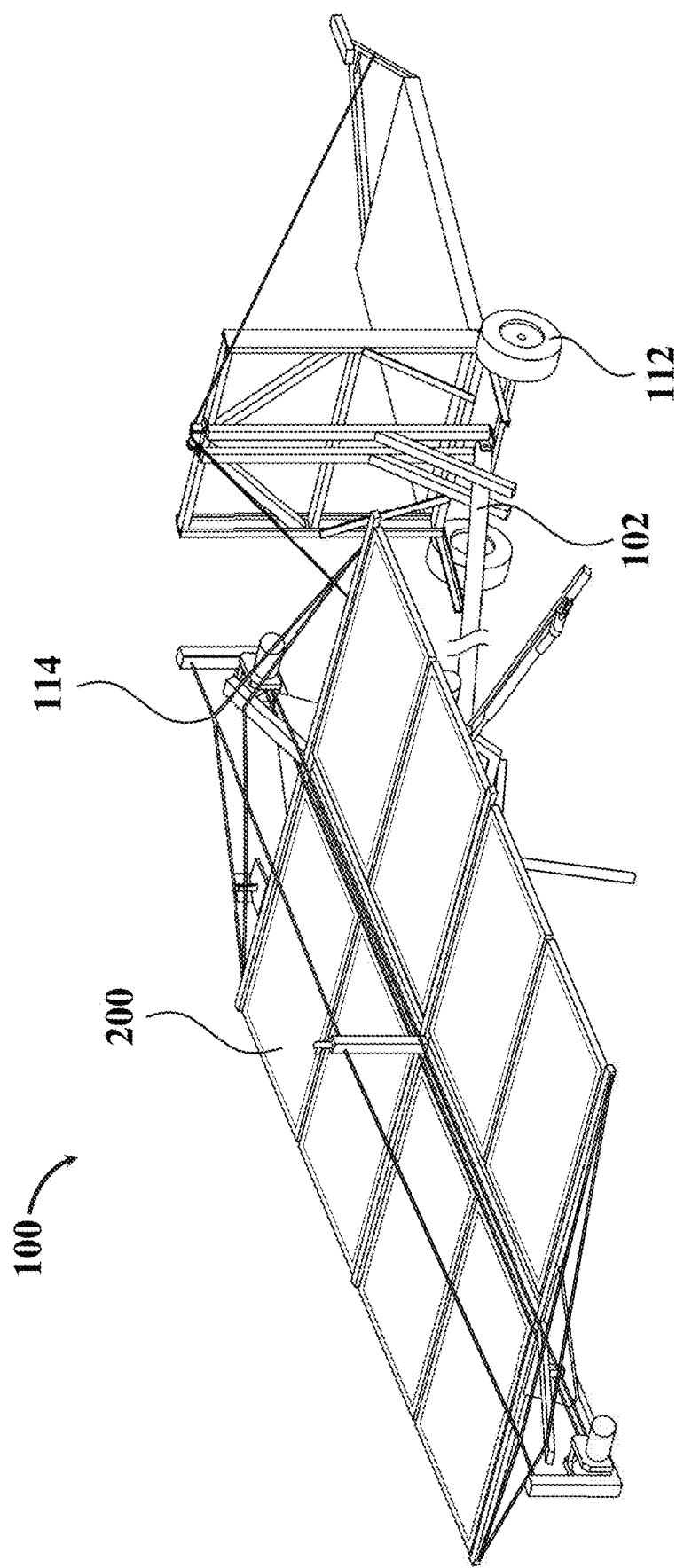
FIG. 10A is a graphical illustration depicting a perspective view of a solar panel mounting apparatus in a neutral position, according to an embodiment of the present disclosure.
Figure 10B:
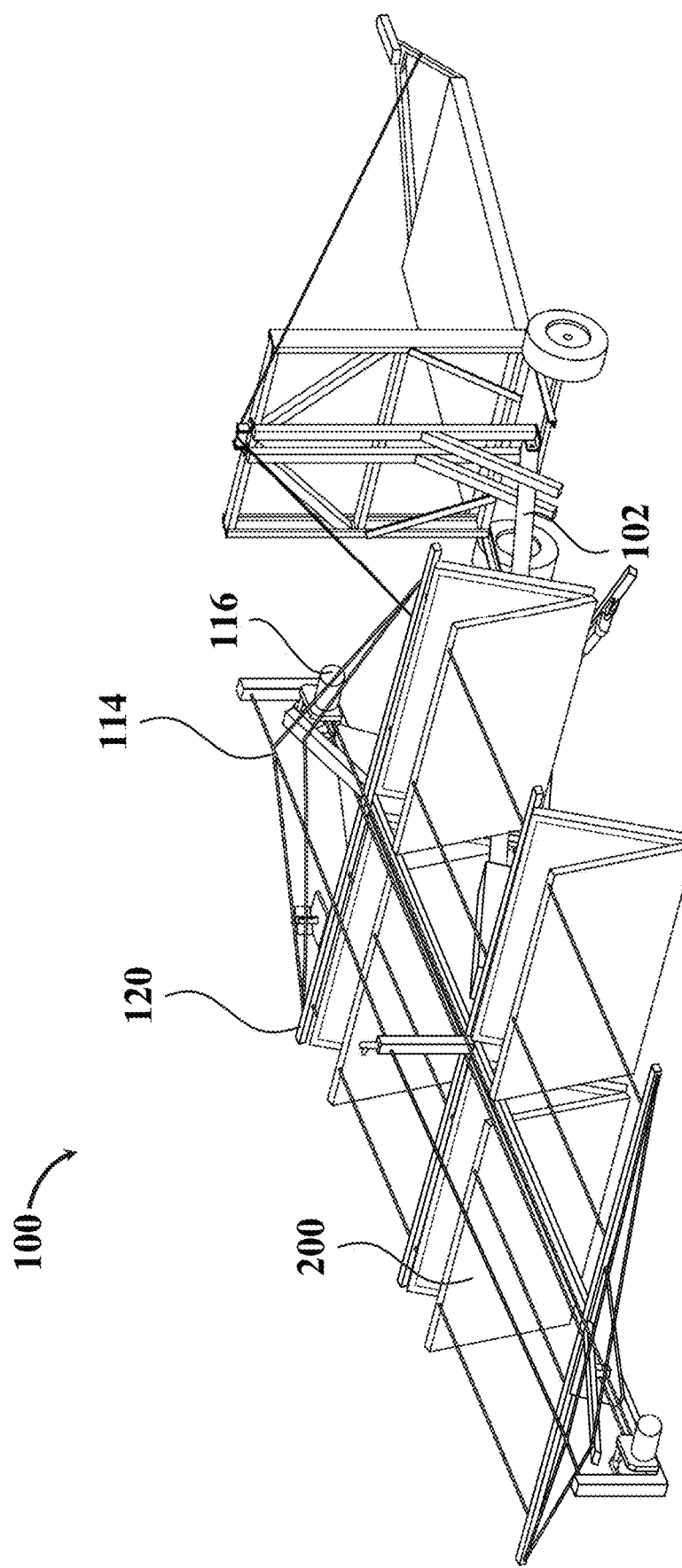
FIG. 10B is a graphical illustration depicting a perspective view of a solar panel mounting apparatus in a protection position, according to an embodiment of the present disclosure.

In addition as shown in FIG. 10A and FIG. 10B, in conjunction with FIGS. 1-4 and FIG. 7 and FIG. 8, in an embodiment, as disclosed above, solar panel mounting harness 100 may be configured to translate the plurality of photovoltaic cells 200 from a neutral, solar collection position to a protection position (e.g., accordion shape). In this embodiment, as solar panel mounting harness 100 is configured to be disposed within a plurality of weather events and/or environmental conditions, the safety and/or integrity of the plurality of photovoltaic cells is critical to the function of solar panel mounting harness 100. As such, a predetermined level of force may be inputted within the memory of the control unit of solar panel mounting apparatus 100 for a plurality of environments and/or weather conditions (e.g., dessert, wind, snow, hail, hurricane, etc.). In this manner, the at least one force sensor may be configured to detect a directional pressure (e.g., a wind speed, impact upon the plurality of photovoltaic cells, amount of snow/rain fall upon the plurality of photovoltaic cells), such that the detected force may be transmitted to the memory and/or the at least one processor of the control unit.

Accordingly, as shown in FIG. 10A and FIG. 10B, in conjunction with FIGS. 1-4 and FIG. 8, in this embodiment, when the detected force is greater than or equal to the predetermined force at least one of the plurality of environments, the at least one processor may be configured to transmit an electrical signal to the first and/or second safety drive motor 116, 122 of the safety drive module, such that the first safety drive motor 116 and/or the second safety drive motor 122 may be configured to translate at least one of the plurality of cables 114 in mechanical communication with the plurality of solar harnesses 120 from the neutral position to the collapsed position. In this same manner, when the detected force is less than the predetermined force at least one of the plurality of environments, the at least one processor may be configured to transmit an electrical signal to the first and/or second safety drive motor 116, 122, such that the first safety drive motor 116 and/or the second safety drive motor 122 may be configured to translate at least one of the plurality of cables 114 in mechanical communication with the plurality of solar harnesses 120 from the collapsed position to the neutral position.

Figure 11A:
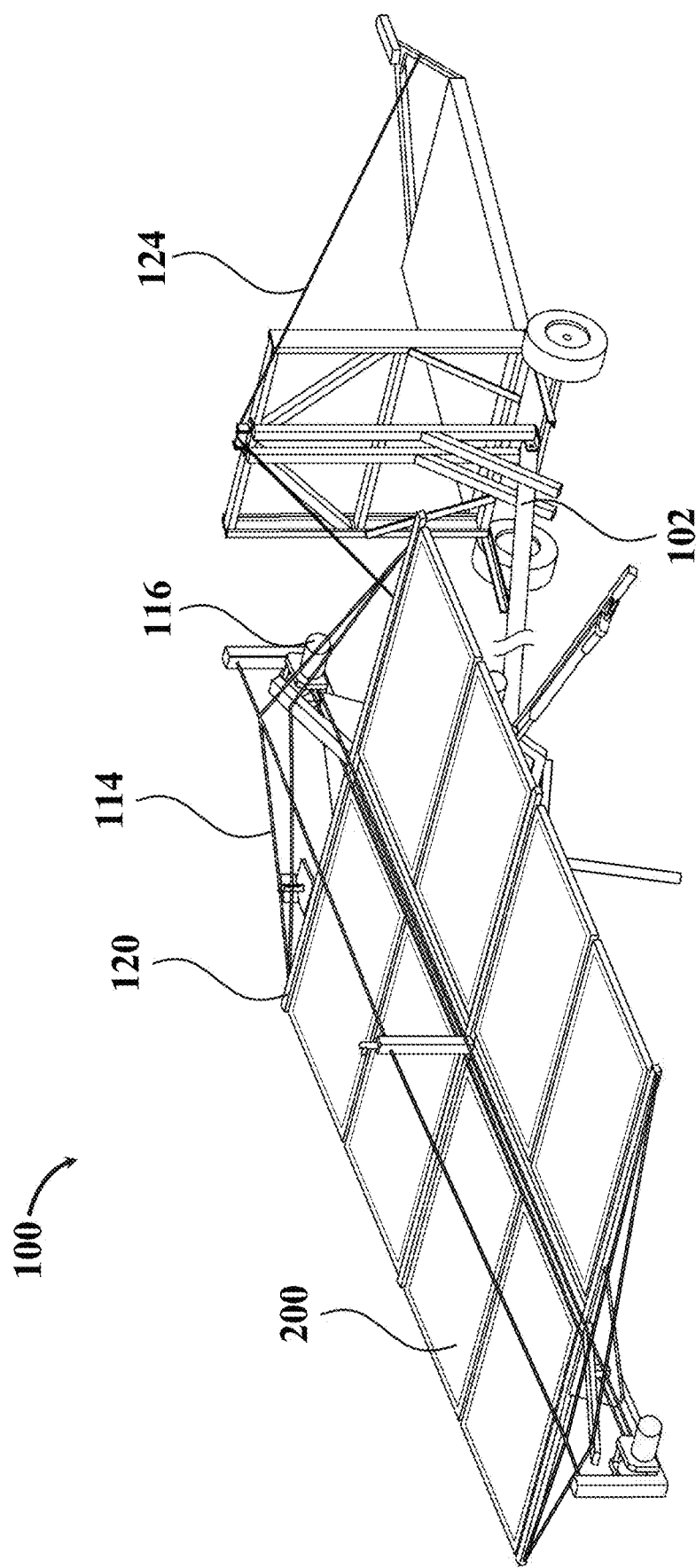
FIG. 11A is a graphical illustration depicting a perspective view of a solar panel mounting apparatus in a first height position, according to an embodiment of the present disclosure.
Figure 11B:
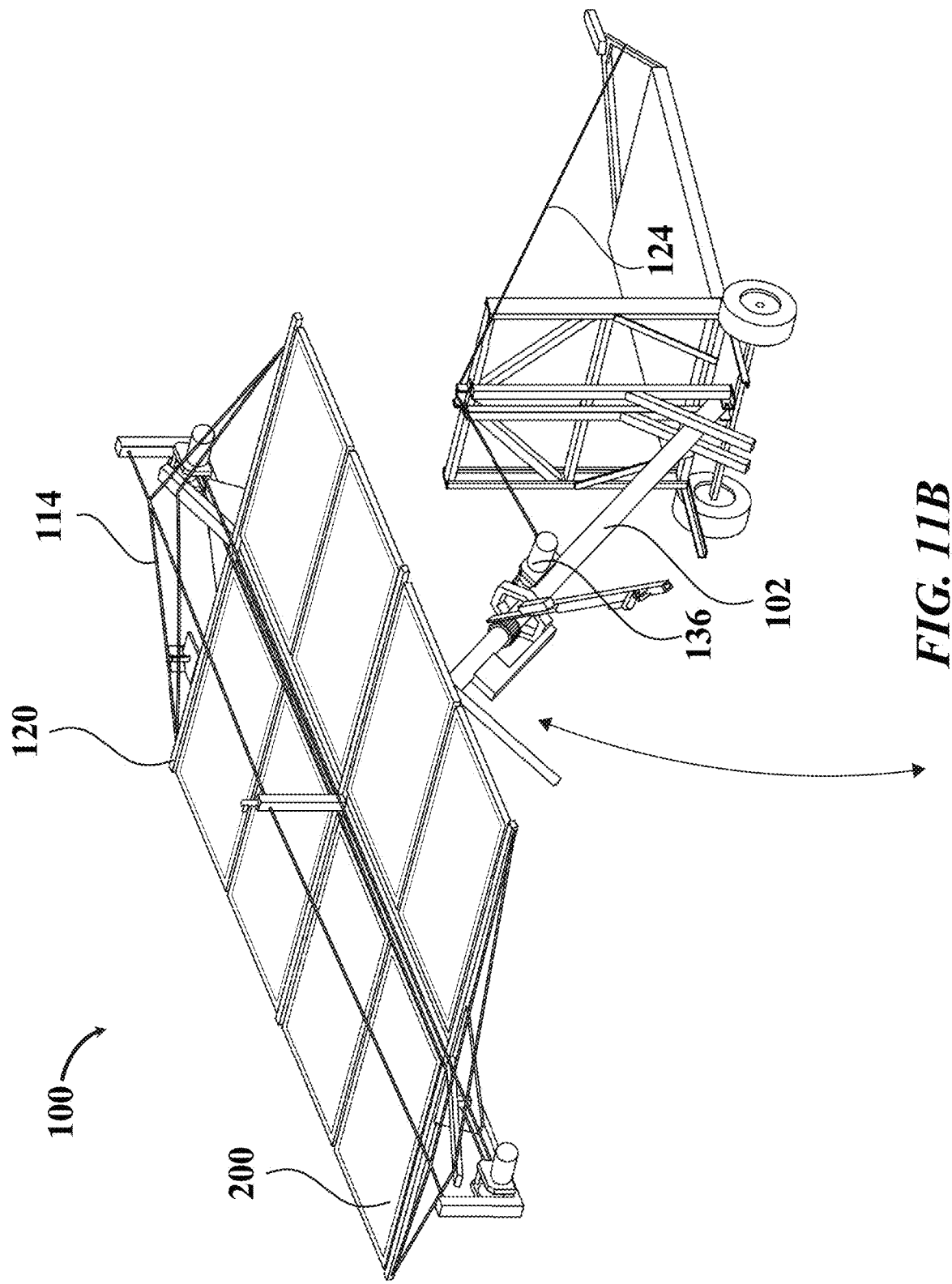
FIG. 11B is a graphical illustration depicting a perspective view of a solar panel mounting apparatus in a second height position, according to an embodiment of the present disclosure.

As shown in FIG. 11A and FIG. 11B, in conjunction with FIGS. 1-4 and FIG. 7, in an embodiment, as disclosed above, solar panel mounting apparatus 100 may comprise raising drive module 136 in mechanical communication with raising cable 124, such that mounting end 146 may be translated from the predetermined ground position to the plurality of predetermined height positions, and/or vice versa. In this manner, raising drive module 136 may be in mechanical communication with raising cable 124, such that raising cable 124 may wrap within a raising cable storage unit of raising drive module 136. In this embodiment, a first end of raising cable 124 may be affixed to at least one portion of mobility module 108 and/or a second end of raising cable 124 may be affixed to the raising cable storage unit of raising drive module 136, as shown in FIG. 7.

Furthermore, as disclosed above, the raising drive module 136 may be communicatively coupled to the at least one processor of the control unit (e.g., at least one computing device) of the solar panel mounting apparatus, such that subsequent to receiving an electrical signal, via at least one user interface of the control unit and/or at least one user interface of at least one external control unit communicatively coupled to the processor, the at least one processor may transmit a signal to raising drive module 136, such that raising drive module may raise mounting end 108 of framework 102 to at least one of a plurality of predetermined and/or desired height positions based on the inputted height, via the at least one user interface.

In addition, in some embodiments, raising drive module 136 may comprise of a track and/or gear system. As such, raising drive module 136 may be disposed within an internal cavity of framework 102. As such, in these other embodiments, framework 102 may comprise at least one additional independent platform disposed within the internal cavity of framework 102. In these other embodiments, framework 102 may be telescopically coupled to the at least one additional independent platform. In this manner, the raising drive module 136 may be disposed about at least one portion of the at least one additional independent platform, such that subsequent to activating, the raising drive module 136 may be configured to telescopically open and/or collapse (e.g., follow a slotted path) mounting end 146 of framework 102, via the track and gear system, to at least one of a plurality of predetermined and/or desired heights.

Accordingly, in these other embodiments, rotation drive module 110 may comprise at least one locking mechanism, such that mounting end 146 of framework 102, at least one of the plurality of protection cables 114 and/or at least one of the plurality of solar panel harnesses 120 may be locked and/or stationary within a predetermined orientation, while raising drive module 136 is activated. As such, mounting end 146 of framework 102 may retain the same orientation during the raising processes, allowing for additional protection of at least one of the plurality of photovoltaic cells 200, as mounting end 146 of framework 102, the plurality of protection cables 114, and/or the plurality of solar panel harnesses 120 may not be freely moving.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

Glossary of Claim Terms

As used herein, the term "Accordion Orientation" refers to a configuration of the solar panels where the plurality of photovoltaic cells may be arranged in a folded and/or collapsed manner to reduce exposure to environmental elements and/or weather conditions, including but not limited to as high winds and/or hail. This orientation may be activated by the safety drive module and/or may be intended to minimize the surface area of the photovoltaic cells exposed to potential damage, protecting the cells during adverse weather conditions. The transition to this configuration may be controlled by the protection cables, which may fold the photovoltaic cells into a compact state. When conditions improve, the safety drive module may return the photovoltaic cells to a neutral position optimized for solar energy collection.

As used herein, the term "Azimuth Angle" refers to the horizontal angular position of the sun relative to a reference direction (e.g., a central axis of framework 102 of solar panel mounting apparatus 100), typically measured in degrees from true north. The azimuth angle may define the position of the sun along the horizon, which is essential for adjusting the orientation of the photovoltaic cells to capture maximum sunlight throughout the day. The control unit may utilize the azimuth angle to direct the rotation drive module, ensuring that the solar panels may be aligned with the sun's horizontal movement from east to west. By continuously adjusting the solar panel's angle based on real-time azimuth angle data, the solar panel mounting apparatus may maintain optimal exposure to direct sunlight, thus enhancing the overall efficiency of solar energy collection. Accurately tracking the azimuth angle may be critical for optimizing energy output, especially during sunrise and/or sunset when the sun's position changes rapidly along the horizon.

As used herein, "Base End" refers to the lower section of the framework of the solar panel mounting apparatus that serves as the foundation and provides stability to the overall structure. The base end may be designed to rest securely on a ground surface and/or another stable platform and/or may include components such as the mobility module comprising a plurality of wheels. This base end may allow for the relocation and/or translation of the solar panel mounting apparatus to an optimal position for sunlight exposure. The base end may support other elements like the mounting end and/or may help maintain system balance during operations such as photovoltaic cell rotation, tilting, and/or retraction.

As used herein, the term "Control Unit" refers to the electronic component within the solar panel mounting apparatus that may manage the operations of the motorized rotation drive module, safety drive module, and/or raising drive module. The control unit may process input from various sensors, such as solar sensors and/or force sensors, to adjust the orientation of the plurality of photovoltaic cells for optimal energy capture. The control unit may automatically and/or continuously adjust and/or modify the position of at least one of the plurality of photovoltaic cells, in real-time, based on time-of-day data and/or detected environmental conditions. The control unit may be responsible for coordinating the transition between energy collection mode (i.e., activating rotation drive module) and/or protective mode (i.e., activating collapsable drive module), ensuring the efficiency and the safety of the plurality of photovoltaic cells.

As used herein, the term "Force Sensor" refers to a device and/or sensor integrated into the solar panel mounting apparatus that measures the magnitude and/or direction of physical forces exerted on the photovoltaic cells or the framework. This sensor may detect pressure from environmental factors such as wind, snow, hail, and/or other external impacts known in the art that may affect the stability and/or structural integrity of the photovoltaic cells. The force sensor may be communicatively coupled to the control unit, transmitting data about detected forces in real-time. Upon receiving force data that exceeds a predetermined threshold from the force sensor, the control unit may then activate the safety drive module to retract the solar panels into a protection (e.g., collapsed-accordion) orientation, minimizing the risk of damage. The force sensor may ensure that the system can respond proactively to changing environmental conditions, allowing the control unit to automatically initiate measures to safeguard the solar panels against potential physical harm. This functionality may be crucial for maintaining the integrity and/or longevity of the solar energy collection system under varying weather conditions and/or environmental elements.

As used herein, the term "Framework" refers to the structural assembly that supports the photovoltaic cells and/or provides the necessary rigidity for the solar panel mounting apparatus. The framework may comprise a mounting end where the plurality of photovoltaic cells may be affixed and/or a base end that supports the entire structure. The framework may be designed to withstand various environmental conditions while facilitating the controlled movement of the photovoltaic cells via the rotation drive module and/or safety drive module. The framework may be essential for maintaining the stability of the photovoltaic cells during adjustments in orientation for tracking sunlight and/or during the transition to the protection position.

As used herein, the term "Mobility Module" refers to a component of the solar panel mounting apparatus that allows the solar panel mounting apparatus to be moved and/or repositioned manually and/or automatically. The mobility module may include a set and/or plurality of wheels attached to the base end of the framework, enabling users to transport the solar panel mounting apparatus to an optimal location for solar energy collection. The mobility module may also include a handle and/or hitch for easy maneuvering. The mobility module may be particularly useful for adjusting the position of the solar panel mounting apparatus to avoid shadows and/or obstructions, ensuring maximum exposure to sunlight throughout the day.

As used herein, the term "Mounting End" refers to the upper part of the solar panel mounting apparatus that supports the array of photovoltaic cells. The mounting end may be in mechanical communication with the motorized rotation drive module and/or the safety drive module, allowing it to adjust the orientation of the plurality of photovoltaic cells based on sunlight and/or weather conditions and/or environmental elements. The mounting end of the framework may be designed to pivot, tilt, and/or collapse as needed to optimize solar exposure and/or to protect the panels during adverse weather conditions. The mounting end may also be connected to the plurality of solar panel harnesses that secure the plurality of photovoltaic cells in place.

As used herein, the term "Neutral Position" refers to the default orientation of the plurality of photovoltaic cells when they are positioned flat and/or ready to collect solar energy. In this position, the photovoltaic cells may be aligned to maximize exposure to direct sunlight. The neutral position may be managed by the rotation drive module, the safety drive module, and/or the control unit, which may adjust the photovoltaic cells throughout the day to maintain optimal angles relative to the sun's position and/or the protection of the photovoltaic cells. This position contrasts with the protection position (i.e., collapsed position), which may be activated during extreme weather conditions to shield the photovoltaic cells from potential damage.

As used herein, the term "Photovoltaic Cells" refer to the individual solar energy conversion units. These cells convert sunlight into electrical energy through the photovoltaic effect, making them critical to the energy generation capabilities of a solar panel. The photovoltaic cells may be supported by the plurality of solar panel harnesses and/or may be adjusted in orientation by the rotation drive module for optimal solar capture. In adverse weather, the plurality of photovoltaic cells may be protected by the safety drive module, which repositions them into a protection position (e.g., an accordion orientation) to minimize exposure to damaging elements like wind and hail.

As used herein, the term "Protection Cables" refer to the structural components that facilitate the movement of the solar panels between a neutral energy-collection position and a protection (e.g., collapsed-accordion) position. These cables may be in mechanical communication with the safety drive module and/or the plurality of solar panel harnesses, enabling the controlled retraction and/or extension of the plurality of photovoltaic cells. The protection cables may ensure that the plurality of photovoltaic cells may be quickly adjusted to minimize surface area exposure during extreme weather conditions, safeguarding the photovoltaic cells from damage. The protection cables may play a key role in transitioning the panels to an accordion orientation for enhanced protection.

As used herein, the term "Protection Position" refers to a specific configuration (e.g., an accordion orientation) of the solar panel mounting apparatus where the plurality of photovoltaic cells are retracted and/or collapsed to minimize exposure to adverse weather conditions. The protection position may typically be activated by the safety drive module in response to environmental element and/or weather condition inputs such as high wind speeds, hail, and/or other conditions known in the art detected by the force sensor. In the protection position, the plurality of photovoltaic cells may adopt an accordion-like orientation, where the plurality of photovoltaic cells may be folded or compacted within the framework, reducing their surface area and/or vulnerability to damage. The protection position may help to shield at least one of the plurality of photovoltaic cells from direct impacts and/or extreme weather, preserving the structural integrity and/or functionality of each of the plurality of photovoltaic cells disposed upon the solar panel mounting apparatus. The transition to and from the protection position may be automated by the control unit and/or manually overridden by a user, ensuring flexibility in response to varying environmental conditions.

As used herein, the term "Raising Drive Module" refers to a motorized mechanism integrated into the solar panel mounting apparatus that enables the adjustment of the vertical position of the mounting end relative to the base end. The raising drive module may be in mechanical communication with the framework, allowing it to lift and/or lower the mounting end, and consequently, the plurality of photovoltaic cells, along a vertical axis. This adjustment allows the plurality of photovoltaic cells to be positioned at different elevations to optimize sunlight exposure, especially in environments where terrain and/or nearby obstacles might block sunlight at lower angles. The raising drive module may also include a raising cable and/or track system that may extend and/or retract to achieve various predetermined and/or desired height positions. The raising drive module may be designed to ensure smooth elevation changes without compromising the structural stability of the solar panel mounting apparatus. The raising drive module may be controlled automatically by the control unit, based on real-time environmental data, and/or manually through user inputs, providing flexibility in positioning the solar panels for optimal energy capture. Additionally, the raising drive module may coordinate with the mobility module to maintain the selected elevation during the relocation of the apparatus.

As used herein, the term "Rotation Drive Module" refers to the motorized mechanism responsible for adjusting the orientation of the solar panels throughout the day. The rotation drive module may be connected to the control unit, which provides time-of-day data and/or real-time sunlight sensor input, via the solar sensor, to ensure optimal positioning of the panels for maximum sunlight exposure. The rotation drive module may allow the photovoltaic cells to pivot and/or tilt along a predetermined axis (e.g., a yaw adjustment with respect to the central axis of the framework), enabling adaptive tracking of the sun's movement. The rotation drive module may enhance the overall efficiency of the solar energy system by continuously adjusting the angle of the panels to align with the sun.

As used herein, the term "Safety Drive Module" refers to the motorized component of the solar panel mounting apparatus that facilitates the movement of the photovoltaic cells into a protection position. The safety drive module may be activated by signals from the control unit, via input from the force sensor, and/or manual override controls, enabling the controlled retraction of the photovoltaic cells into a collapsed, accordion orientation during adverse weather conditions. Then safety drive module may ensures the protection of the photovoltaic cells from damage caused by high winds, hail, and/or other environmental hazards and/or weather conditions known in the art. It is a critical element for maintaining the durability and longevity of the solar panels.

As used herein, the term "Solar Panel Harnesses" refer to the support structures that secure each photovoltaic cell to the mounting end of the solar panel apparatus. The solar panel harnesses may be designed to maintain the alignment of the photovoltaic cells while allowing for controlled movement during retraction and/or adjustment of the photovoltaic cells. The solar panel harnesses may be connected to the plurality of protection cables, safety drive module, and/or the rotation drive module, enabling the transition of the cells between the neutral position for energy collection and the protection (e.g., collapsed-accordion) position. The solar panel harnesses may ensure the stability of the photovoltaic cells during both operational and/or safety mode transitions.

As used herein, the term "Solar Radiation" refers to the electromagnetic energy emitted by the sun, which is captured by the photovoltaic cells for conversion into electrical energy. Solar radiation is the primary source of energy that the solar panel mounting apparatus is designed to harness through adaptive tracking and/or optimal positioning of the photovoltaic cells. The control unit and/or solar sensors may continuously monitor solar radiation levels to adjust the angle of the photovoltaic cells for maximum absorption. Effective management of solar radiation may be critical for optimizing the energy output of the solar panel mounting apparatus and/or the plurality of photovoltaic cells.

As used herein, the term "Solar Sensor" refers to a device and/or sensor integrated into the solar panel mounting apparatus to detect the intensity and/or angle of incoming sunlight. These solar sensors may provide real-time data to the control unit, enabling the precise adjustment of the solar panels through the rotation drive module. The solar sensors may ensure that the photovoltaic cells are positioned at an optimal angle relative to the sun's position throughout the day, enhancing the overall efficiency of solar energy collection. The solar sensors may be essential for the automatic tracking feature of the solar panel apparatus.

As used herein, the term "Time-of-Day Data" refers to the information regarding the current time and/or corresponding position of the sun throughout the day. The control unit may utilize time-of-day data, via the at least one solar sensor, to adjust the orientation of the photovoltaic cells, ensuring the photovoltaic cells may be aligned to capture the maximum amount of sunlight. The time-of-day data may allow the rotation drive module to predict the sun's trajectory and/or make preemptive adjustments to the panels' angle. Time-of-day data may be integral to the ability of the solar panel mounting apparatus to automatically track the sun's movement, enhancing the photovoltaic cells' efficiency in energy capture.

As used herein, the term "Wind Speed" refers to the velocity of air movement detected by the force sensor as part of the solar panel mounting apparatus. Wind speed data may be crucial for determining when the photovoltaic cells should be retracted into a protection position to avoid damage. When the wind speed exceeds a predetermined threshold, the force sensor may send a signal to the control unit, which may activate the safety drive module to initiate the photovoltaic retraction process. Monitoring wind speed may help protect the photovoltaic cells and/or ensures the durability of the solar panel apparatus.

As used herein, the term "Yaw Adjustment" refers to the rotational movement of the solar panel mounting system about a vertical axis (e.g., a central axis of the framework), allowing the panels to track the sun's horizontal movement across the sky. The yaw adjustment may be controlled by the rotation drive module and/or may ensure that the photovoltaic cells remain aligned with the sun's position, regardless of changes in its east-west trajectory throughout the day. Yaw adjustment may be essential for maintaining the orientation of the photovoltaic cells to maximize exposure to direct sunlight and/or may be an integral part of the adaptive tracking mechanism.

As used herein, the term "Zenith Angle" refers to the angle formed between the sun's position and a line perpendicular to the Earth's surface at the location of the solar panel mounting apparatus. The zenith angle may vary throughout the day and/or may affect the optimal tilt of the photovoltaic cells for maximum energy absorption. The control unit may calculate adjustments based on changes in the zenith angle, using the rotation drive module to tilt the panels accordingly. Proper adjustment to the zenith angle may allow the solar panel mounting apparatus to achieve higher efficiency by aligning each of the plurality of photovoltaic cells with the sun's direct rays.

INCORPORATION BY REFERENCE

Shaw, Ian H. U.S. Pat. Pub. No. 2013/0319402 A1, United States Patent and Trademark Office, 5 Dec. 2013.

Scanlon, Mark. U.S. Pat. Pub. No. 2013/0118099 A1, United States Patent and Trademark Office, 16 May 2013.

Panish, David. U.S. Pat. No. 9,654,053 B2, United States Patent and Trademark Office, 16 May 2017.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A solar panel mounting apparatus for optimizing solar energy capture, the solar panel mounting apparatus comprising:
   a framework comprising a mounting end and a base end, the mounting end of the framework being adapted to support a plurality of photovoltaic cells;
   a rotation drive module disposed about at least one portion of the framework, the rotation drive module being in mechanical communication with the mounting end of the framework, wherein the rotation drive module comprises a ball bearing system, such that the ball bearing system enables an orientation of the mounting end of the framework to be continuously adjusted in relation to the elevation, location, or both of the sun throughout each day independent of a remainder of the framework;

a safety drive module disposed about at least one portion of the mounting end of the framework, the safety drive module being in mechanical communication with the mounting end, the plurality of photovoltaic cells, or both, wherein the safety drive module enables an adjustment of position of at least one of the plurality of photovoltaic cells from a neutral position to a protection position in relation to a weather event, an environmental condition, or both; and a raising drive module in mechanical communication with the mounting end of the framework, a mobility module, or both, the raising drive module comprising a locking mechanism configured to secure the mounting end of the framework at a selected height position.

2. The solar panel mounting apparatus of claim 1, further comprising a plurality of solar panel harnesses, each of the plurality of solar panel harnesses being affixed to each of the plurality of photovoltaic cells, wherein the plurality of solar panel harnesses couple the plurality of photovoltaic cells to the mounting end of the framework.

3. The solar panel mounting apparatus of claim 2, further comprising a plurality of protection cables, the plurality of protection cables being in mechanical communication with the plurality of solar panel harnesses and the safety drive module.

4. The solar panel mounting apparatus of claim 3, wherein subsequent to activation of the safety drive module, the plurality of protection cables are configured to translate, rotate, or both at least one of the plurality of harnesses from the neutral position to the protection position.

5. The solar panel mounting apparatus of claim 4, wherein the neutral position comprises an orientation configured to receive maximum solar radiation from the sun.

6. The solar panel mounting apparatus of claim 4, wherein the protection position comprises an accordion orientation configured to protect at least one of the plurality of photovoltaic cells from the weather event, the environmental condition, or both.

7. The solar panel mounting apparatus of claim 1, wherein the mobility module is affixed to the base end of the framework, wherein the mobility module enables the translation of the framework from a first location to at least one alternative location.

8. The solar panel mounting apparatus of claim 7, wherein the framework further comprises a handle, whereby, subsequent to a manually applicable directional pressure being received by the handle, the plurality of wheels causes the framework to be translated from the first location to the at least one alternative location.

9. The solar panel mounting apparatus of claim 7, wherein the raising drive module enables an elevation change of the mounting end of the framework from a first predetermined location to a plurality of height positions based on a surrounding environment.

10. The solar panel mounting apparatus of claim 2, further comprising a control unit having at least one processor, the at least one processor being communicatively coupled to the rotation drive module, the safety drive module, or both.

11. The solar panel mounting apparatus of claim 10, further comprising:

a solar sensor disposed about at least one portion of at least one of the plurality of solar panel harnesses, at least one of the plurality of photovoltaic cells, or both, wherein the solar sensor is configured to detect an amount of solar light, solar irradiance, or both collected by the plurality of photovoltaic cells, transmit the detected amount of solar light, solar irradiance, or both to the at least one processor, or both; and a force sensor disposed about at least one portion of at least one of the plurality of solar panel harnesses, at least one of the plurality of photovoltaic cells, or both, wherein the force sensor is configured to detect an amount of directional pressure applied to at least one of the plurality of photovoltaic cells, transmit the detected amount of directional pressure to the at least one processor, or both.

12. The solar panel mounting apparatus of claim 11, wherein subsequent to receiving the detected amount of solar light, solar irradiance, or both from the solar sensor, the at least one processor is configured to cause the rotation drive module to tilt, rotate, or both the mounting end of the framework with respect to a central axis of the framework to an orientation ensuring maximum solar light, solar irradiance, or both collection by at least one of the plurality of photovoltaic cells.

13. The solar panel mounting apparatus of claim 11, wherein subsequent to receiving the detected applied directional pressure from the force sensor, the at least one processor is configured to cause the safety drive module to translate, rotate, or both the mounting end of the framework from the neutral position to the protection position, thereby causing the plurality of photovoltaic cells to translate into an accordion shape.

* * * * *